United States Patent [19]

Segerson

[11] Patent Number: 4,741,584
[45] Date of Patent: May 3, 1988

[54] FIBER OPTIC TAP CONNECTOR AND METHOD

[75] Inventor: Eugene A. Segerson, Tempe, Ariz.

[73] Assignee: Motorola Inc., Schaumburg, Ill.

[21] Appl. No.: 947,231

[22] Filed: Dec. 29, 1986

[51] Int. Cl.⁴ .............................................. G02B 6/42
[52] U.S. Cl. .............................. 350/96.15; 350/96.20; 83/613; 83/875
[58] Field of Search ............... 350/96.15, 96.20; 250/227; 83/875, 613; 225/2, 96, 96.5

[56] References Cited

U.S. PATENT DOCUMENTS

| 3,946,467 | 3/1976 | Lukas et al. | 350/96.2 X |
| 4,103,154 | 7/1978 | d'Auria et al. | 350/96.15 X |
| 4,257,546 | 3/1981 | Benasutti | 225/2 X |
| 4,602,845 | 7/1986 | Anderton | 350/96.20 |

FOREIGN PATENT DOCUMENTS

| 0166550 | 1/1986 | European Pat. Off. |
| 58-52612 | 3/1983 | Japan | 350/96.20 |
| 2119118 | 11/1983 | United Kingdom | 350/96.20 |

Primary Examiner—John Lee
Assistant Examiner—Michael Menz
Attorney, Agent, or Firm—Joe E. Barbee; Harry A. Wolin

[57] ABSTRACT

A fiber optic tap connector which is inexpensive and easy to use to tap off an optical signal from the fiber optic line between emitter and detector points without causing a significant loss in the original signal. The fiber optic tap connector includes a shear having an outwardly extending cutting surface below a window through which the signal is emitted after the tapping procedure has been performed.

15 Claims, 2 Drawing Sheets

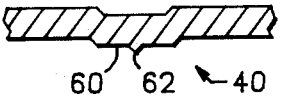
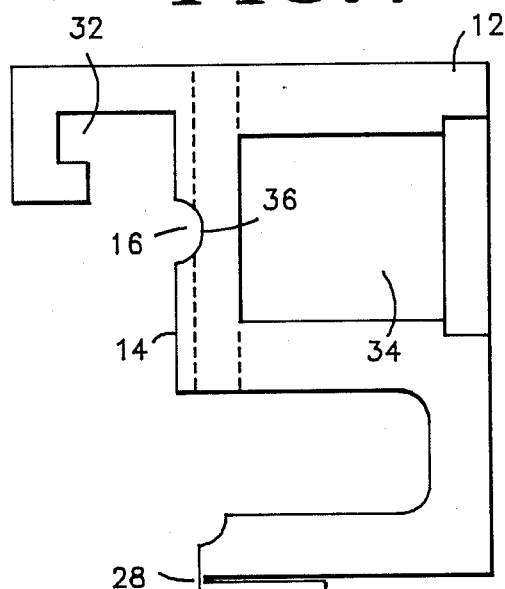
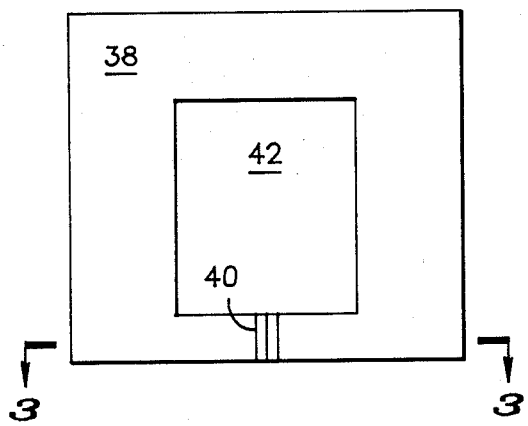
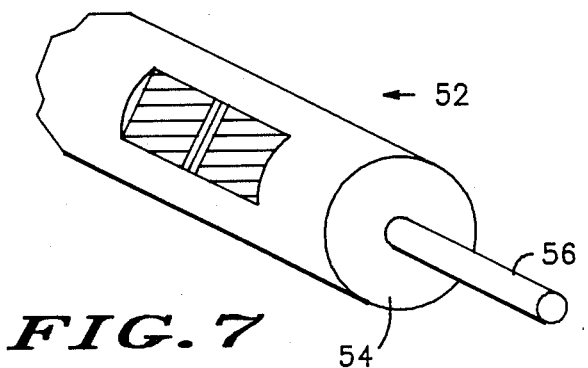

FIBER OPTIC TAP CONNECTOR AND METHOD

BACKGROUND OF THE INVENTION

This invention generally pertains to a fiber optic tap connector and method. Generally, in using fiber optics, it is desirable to tap off an optical signal from the fiber optic line between emitter and detector points without causing a significant loss in the original signal. This is done using either a passive tap connector or an active tap connector. An active tap connector generally includes a semiconductor device which converts the optical signal to an electrical signal while a passive tap connector merely taps into the fiber optic line.

Prior fiber optic taps have generally been very complex and expensive. Additionally, many have required a trained technician for installation. Some fiber optic taps have required that the fiber optic line be polished in addition to tapping. Others have used various liquids so that the fiber optic line can be tapped in a medium having the same index of refraction. Many present applications require a fiber optic tap which is inexpensive, simple, and relatively easy to install.

SUMMARY OF THE INVENTION

The present invention pertains to an active fiber optic tap connector (containing a semiconductor device). The present invention generally includes a body, a clamp means for locking the clamp to the body, a shear and a semiconductor detector. More specifically, a fiber optic line is inserted in an outwardly facing notch in the body and the clamp which is connected to the body by hinge means is closed and locked. The clamp has an inwardly facing notch which is disposed opposite the notch in the body when the clamp is closed thereby surrounding the fiber optic line. Next, a shear is pressed down thereby cutting into the sheath and cutting a V-shaped groove into the core of the fiber optic line. The shear is under constant pressure from the tight fitting body. Once the fiber optic line is tapped, the tapped section of the line is aligned with a window in the shear thereby allowing the optical signal to be emitted into a semiconductor device.

It is an object of the present invention to provide a new and improved fiber optic tap connector which does not require a trained technician or special tools to install.

It is a further object of the present invention to provide a new and improved fiber optic tap connector which is inexpensive and simple to manufcture.

It is a further object of the present invention to provide a new and improved fiber optic tap connector which taps off an optical signal from the fiber optic line between emitter and detector points without causing a significant loss in the original signal.

These and other objects of this invention will be apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a cross-sectional view of a one piece molded body and clamp of a fiber optic tap connector of the present invention;

FIG. 2 is a front view of a shear used in the present invention;

FIG. 3 is a cross-sectional view of a cutting surface of a shear used in the present invention taken from line 3—3 of FIG. 2;

FIG. 7 is a perspective view of a fiber optic line showing a tap obtained from the present invention.

DESCRIPTION OF THE PREFERRED EMBODIMENT

Figure 6:
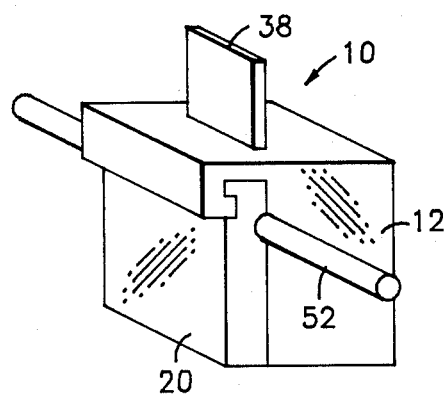
FIG. 6 is a perspective view of a fiber optic tap connector embodying the present invention having a fiber optic line inserted and the gate closed and locked.

Referring specifically to FIG. 1, a body, 12, and a clamp, 20, are shown. Body 12 and clamp 20 as shown here are a one piece thermoplastic molded housing which incorporates a hinge, 28. In this embodiment, hinge 28 is a living hinge, which is a thin, compliant section of molded thermoplastic between body 12 and clamp 20. Body 12 has a first face, 14, which incorporates an outwardly facing notch, 16. Outwardly, facing notch 16 is exposed to a shear groove, 18, by an opening, 36. Clamp 20 includes a first face, 22, having an inwardly facing notch, 24. Inwardly facing notch 24 has a number of serrations, 26, which will be explained presently. Clamp 20 includes a male locking means, 30, while body 12 includes a female locking means, 32. When clamp 20 is closed, male locking means 30 and female locking means 32 lock thereby holding clamp 20 in a prearranged position relative to body 12.

FIG. 2 is a front view of a shear, 38, which is used in the present invention. Shear 38 includes an outwardly extending, cutting surface 40. Additionally, above cutting surface 40 is a window, 42.

FIG. 3 shows a cross-section view of cutting surface 40 taken from line 3—3 of FIG. 2. Cutting surface 40 includes a flat surface, 60, and a V-shaped surface, 62.

Figure 4:
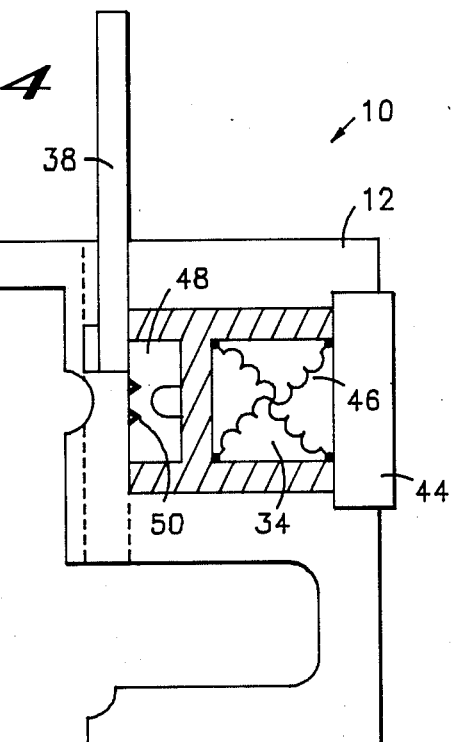
FIG. 4 is a view similar to FIG. 1 of the present invention prior to the insertion of a fiber optic line.

Referring specifically to FIG. 4 a cross-sectional view of a fiber optic tap connector, 10, similar to FIG. 1 is shown. In addition to body 12 and clamp 20 of FIG. 1, fiber optic tap connector 10 includes shear 38 and a retaining plug, 44. Retaining plug 44 is press fit into a plug opening, 34 (see FIG. 1). A spring means, 46, enables retaining plug 44 to keep constant pressure on a semiconductor detector package, 48. Semiconductor detector package 48 has a light detecting face, 50, which encounters an optical signal after the tapping procedure has been completed and converts it to an electrical signal. Spring means 46 causes retaining plug 44 to keep constant pressure on semiconductor detector package 48 which in turn is pressed flush against shear 38.

Figure 5:
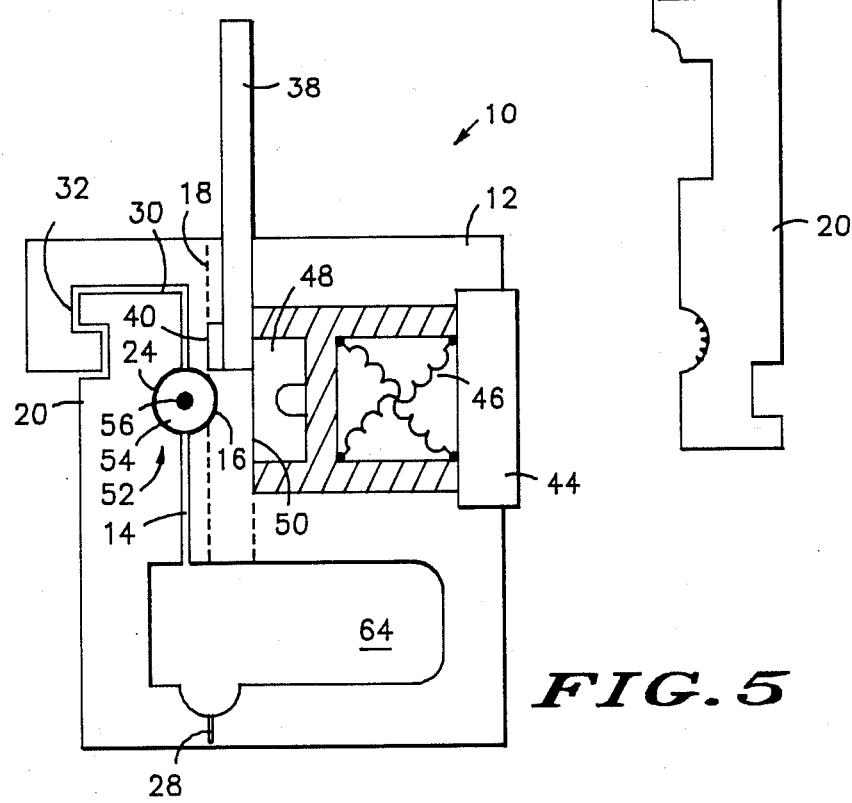
FIG. 5 is a cross-sectional view of a fiber optic tap connector embodying the present invention having a fiber optic line inserted and the clamp closed and locked.

Referring specifically to FIG. 5, fiber optic tap connector 10 shown in cross-section after the insertion of a fiber optic line, 52 and FIG. 6, a perspective view of the same is shown. Fiber optic line 52 includes a sheath, 54, and a core, 56 (see FIG. 7). In FIG. 4, fiber optic tap connector 10 is shown prior to the tapping of fiber optic line 52. Once fiber optic line 52 has been inserted into outwardly facing notch 16 of first face 14 of body 12, hinge means 28 allows clamp 20 to be closed and male locking means 30 is locked into female locking means 32. Once body 12 and clamp 20 are interlocked outwardly facing notch 16 and inwardly facing notch 24 are opposite and surround fiber optic line 52. Serrations 26 (see FIG. 1) of inwardly facing notch 24 grip fiber optic line 52 and keep it from moving. Fiber optic line 52 may be inserted either straight, bent or bowed to allow various light transfers.

Once fiber optic line 52 has been inserted into fiber optic tap connector 10 and it is locked, tapping procedure is ready to begin. Shear 38 is pressed down so that outwardly, cutting surface 40 passes partially through and beyond fiber optic line 52. Flat surface 60 (see FIG. 3) leaves a rectangular cut in sheath 54 while V-shaped surface 62 (see FIG. 3) leaves a small V-shaped groove in core 56. This tap is shown in FIG. 7. This type tap allows for a smaller portion of core 56 to be tapped than sheath 54 thereby allowing easy access to a relatively small tap. Howver, it should be understood that taps having other configurations may also be utilized. Shear 38 is pressed down through shear groove 18 until window 42 (see FIG. 2) becomes aligned with the tapped area of fiber optic line 52. In this embodiment, shear 38 becomes flush with body 12 at the same time as the forementioned alignment occurs. The remainder of shear 38 extends into an internal opening, 64. Additionally, the scrap from fiber optic line 52 falls into internal opening 64. Once this alignment occurs, light detecting face 50 of semiconductor detector package 48 is forced through window 42 (see FIG. 2) by retaining plug 44 and spring means 46 and through the rectangular tap of core 54 so that light detecting face 50 is in intimate contact with core 56 of fiber optic line 52. This enables smieconductor detector package 48 to convert the tapped optical signal into an electrical signal which is relayed through leads 58 of semiconductor package 48.

Thus it is apparent that there has been provided, in accordance with the invention, an improved device and method for the tapping of fiber optic lines which meet the objects and advantages set forth above. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A fiber optic tap connector comprising:
   a body having a first face including an outwardly facing notch, said outwardly facing notch having an opening into a shear groove;
   a clamp having a first face including an inwardly facing notch, said clamp being connected to said body by hinge means;
   means for locking said clamp in a prearranged relationship to said body wherein said outwardly facing notch of said first face of said body and said inwardly facing notch of said first face of said clamp are opposite each other;
   a shear having an outwardly extending cutting surface tightly fit movably disposed in said shear groove; and
   a retaining plug press fit into a plug opening in said body and which applies constant pressure to said shear by an attached spring means.

2. The device of claim 1 wherein the inwardly facing notch of the first face of the clamp includes serrations.

3. The device of claim 1 wherein the body and the clamp are one piece of molded thermoplastic which incorporates a living hinge therebetween.

4. The device of claim 1 wherein the shear includes a window above the cutting surface which becomes aligned in the shear groove with the outwardly facing notch of the first face of the body upon completion of tapping.

5. The device of claim 4 further comprising a semiconductor detector package positioned in the plug opening and kept under constant pressure against the shear by the spring means attached to the retaining plug.

6. The device of claim 5 wherein the semiconductor detector package becomes aligned in the window of the shear upon completion of tapping.

7. An active fiber optic tap detector comprising:
   a body having a first face including an outwardly facing notch, said outwardly facing notch having an opening into a shear groove and a plug opening in communication with the notch opening into the shear groove;
   a clamp having a first face including an inwardly facing notch, said clamp being connected to said body by hinge means;
   means for locking said clamp in a prearranged relationship to said body wherein said outwardly facing notch of said first face of said body and said inwardly facing notch of said first face of said clamp are opposite each other;
   a shear having an outwardly extending, cutting surface and a window above said cutting surface, said shear being movably disposed in said shear groove;
   a semiconductor detector package disposed in the plug opening so that a light detecting face of said semiconductor detector package is exposed to the shear groove; and
   a retaining plug press fit into the plug opening in said body which applies constant pressure to said semiconductor detector package against said shear by an attached spring means.

8. The device of claim 7 wherein the inwardly facing notch of the first face of the clamp includes serrations.

9. The device of claim 7 wherein the body and the clamp are one piece of molded thermoplastic which incorporates a living hinge therebetween.

10. The device of claim 7 wherein the window of the shear becomes aligned in the shear groove with the outwardly facing notch of the first face of the body and the light detecting face of the semiconductor detector package upon completion of tapping.

11. A method for tapping an optical signal from a fiber optic line comprising the steps of:
    providing a fiber optic line;
    providing a fiber optic tap connector including a body having a first face including an outwardly facing notch, said outwardly facing notch having an opening into a shear groove, a clamp having a first face including an inwardly facing notch, said clamp being connected to said body by hinge means, means for locking said clamp in a prearranged relationship to said body, a shear having a window and an outwardly extending, cutting surface tightly fit and movably disposed in said shear groove and a retaining plug press fit into a plug opening in said body which applies constant pressure to said shear by an attached spring means;
    placing said fiber optic line into said outwardly facing notch of said first face of said body;
    closing and locking said clamp so that said inwardly facing notch of said first face of said clamp is oposite said outwardly facing notch of said first face of said body and said fiber optic line is enclosed therebetween; and pressing said shear downward until said cutting surface has tapped said fiber optic line and said window of said shear is aligned with said opening into said shear groove of said outwardly facing notch and the tapped area of said fiber optic line.

12. The method of claim 11 wherein the placing said fiber optic line step includes placing said fiber optic line so that it is disposed either straight, bent, or bowed.

13. The method of claim 11 wherein the providing a fiber optic tap connector step includes the clamp having an inwardly facing notch including serrations thereby allowing better gripping during the closing and locking step.

14. The method of claim 11 wherein the providing a fiber optic tap connector step includes providing a semiconductor detector package having a light detecting face exposed to the shear groove, said semiconductor detector package being kept under constant pressure against the shear by the retaining plug.

15. The method of claim 14 wherein the pressing said shear downward step allows the semiconductor detector package to move forward through the window of the shear and make intimate contact between the light detecting face of said semiconductor detector package and a core of the fiber optic line.

* * * * *